US006883702B2

(12) United States Patent
Hurlimann et al.

(10) Patent No.: US 6,883,702 B2
(45) Date of Patent: Apr. 26, 2005

(54) METHOD AND APPARATUS FOR NMR MEASUREMENT OF WETTABILITY

(75) Inventors: Martin D. Hurlimann, Ridgefield, CT (US); Lalitha Venkataramanan, Stamford, CT (US); Christian Straley, Ridgefield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 34 days.

(21) Appl. No.: 10/384,265

(22) Filed: Mar. 7, 2003

(65) Prior Publication Data

US 2003/0169040 A1 Sep. 11, 2003

Related U.S. Application Data

(60) Provisional application No. 60/366,314, filed on Mar. 21, 2002.

(51) Int. Cl.[7] .................................................. G01V 3/00
(52) U.S. Cl. ....................................................... 234/303
(58) Field of Search ................................ 234/303, 309, 234/306

(56) References Cited

U.S. PATENT DOCUMENTS

| | | | | |
|---|---|---|---|---|
| 5,023,551 A | | 6/1991 | Kleinberg et al. | .......... 324/303 |
| 5,055,787 A | | 10/1991 | Kleinberg et al. | .......... 324/303 |
| 5,055,788 A | | 10/1991 | Kleinberg et al. | .......... 324/303 |
| 5,153,514 A | | 10/1992 | Griffin et al. | ................ 324/303 |
| 5,289,124 A | * | 2/1994 | Jerosch-Herold et al. | ... 324/303 |
| 5,387,865 A | * | 2/1995 | Jerosch-Herold et al. | ... 324/303 |
| 5,796,252 A | | 8/1998 | Kleinberg et al. | .......... 324/303 |
| 6,462,542 B1 | * | 10/2002 | Venkataramanan et al. | . 324/303 |
| 6,522,136 B1 | * | 2/2003 | Hurlimann et al. | ......... 324/303 |
| 6,541,969 B1 | * | 4/2003 | Sigal et al. | .................. 324/303 |
| 6,570,382 B1 | * | 5/2003 | Hurlimann et al. | ......... 324/303 |

OTHER PUBLICATIONS

Abragram, A. "Principles of Nuclear Magnetism". Clarendon Press, Oxford (1978), pp. 57–63.
Akkurt, R. et al. "NMR Logging of Natural Gas Reservoirs". *SPWLA 36th Annual Logging Symposium* (1995), Paper N.
Flaum, C. et al. "Identification of Gas with the Combinable Magnetic Resonance Tool (CMR)". *SPWLA 37th Annual Logging Symposium* (1996), Paper L.
Freedman, R. et al. "Field Applications of a New Magnetic Resonance Fluid Characterization Method". *2001 Annual Tech. Conf. and Exhib.*, Paper SPE 71713.
Freedman, R. et al. "A New NMR Method of Fluid Characterization in Reservoir Rocks: Experimental Confirmation and Simulation Results". *SPE Journal* (Dec. 2001), Paper SPE 63214, pp. 452–464.
Freedman, R. et al. "Wettability, Saturation, and Viscosity Using the Magnetic Resonance Fluid Characterization Method and New Diffusion–Editing Pulse Sequences". *SPE Annual Tech. Conf. and Exhib.* (2002), Paper SPE 77397, pp. 1–13.
Hurlimann, M. D. et al. "Restricted Diffusion in Sedimentary Rocks: Determination of Surface–Area to Volume Ratio and Surface Relaxivity". *J. Magn. Reson.*, vol. A111, pp. 169–178 (1994).

(Continued)

*Primary Examiner*—Brij B. Shrivastav
(74) *Attorney, Agent, or Firm*—Jody Lynn DeStefanis; William B. Batzer; John J. Ryberg

(57) ABSTRACT

The present invention relates to a method and apparatus for determining the wettability of a porous media, such as bone, plant, food, wood or molecular sieves, etc., having two or more fluids. The method of the present invention correlates a diffusion-relaxation calibration function representative of at least one fluid in the porous media with a 2-D function developed using diffusion-editing to determine wettability of the porous media.

26 Claims, 10 Drawing Sheets

OTHER PUBLICATIONS

Hurlimann, M. D. "Effective Gradients in Porous Media Due to Susceptibilty Differences". *J. Mag. Reson.*, vol. 131 (1998), pp. 232–240.

Hurlimann, M. D. "Diffusion and Relaxation Effects in General Stray Field NMR Experiments." *J. Mag. Reson.*, vol. 148 (2001), pp. 367–378.

Hurlimann, M. D. et al. "Diffusion–Editing: New NMR Measurement of Saturation and Pore Geometry". *SPWLA* 43rd Annual Meeting (2002), pp. 1–378.

Hurlimann, M. D. et al. "Quantitative Measurement of Two–Dimensional Distribution Functions of Diffusion and Relaxation in Grossly Inhomogeneous Fields." *J. Mag. Reson.*, vol. 157 (2002), pp. 31–42.

Hurlimann, M. D. et al. "The Diffusion–Spin Relaxation Time Distribution as an Experimental Probe to Characterize Fluid Mixtures in Porous Media", *J. Chem. Phys.*, vol. 117, No. 22 (2002), pp. 10223–10232.

Mitra, P. P. et al. "Diffusion Propagator as a Probe of the Structure of Porous Media". *Phys. Rev. Lett.*, vol. 68, pp. 3555 (1992).

Morriss, C. E. et al. "Hydrocarbon Saturation and Viscosity Estimation from NMR Logging in the Belridge Diatomite". *The Log Analyst* (Mar.–Apr. 1997), pp. 44–59.

Slijkerman W. F. J. et al. "Processing of Multi–Acquisition NMR Data". *1999 SPE Ann. Tech. Conf. and Exhib.*, SPE 56768.

Venkataramanan, L. et al. "Solving Fredholm Integrals of the First Kind with Tensor Product Structure in 2 and 2.5 Dimensions". *IEEE Trans. Signal Proc.*, vol. 50, No. 5, (May 2002), pp. 1017–1026.

\* cited by examiner

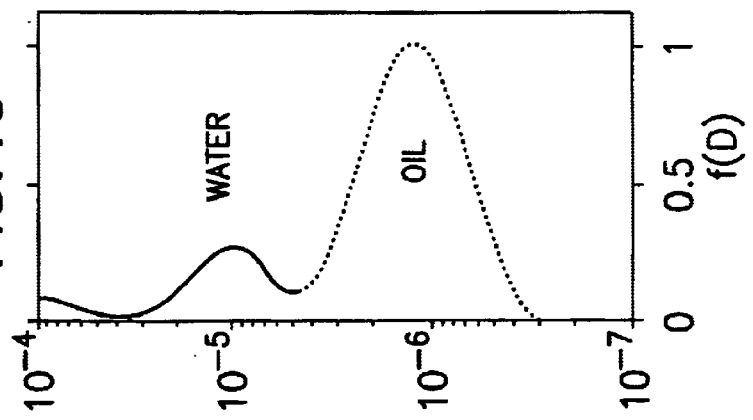
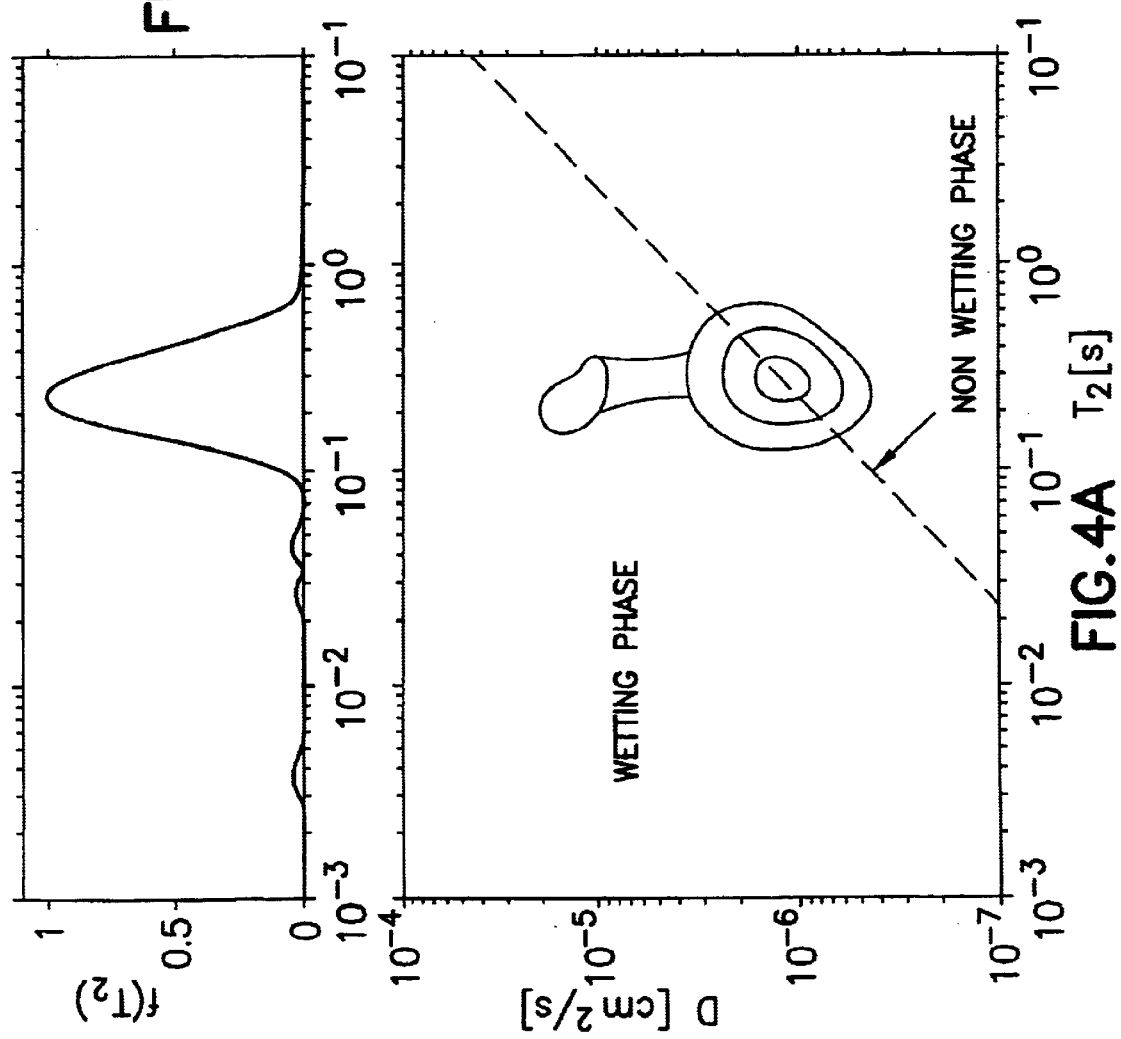

METHOD AND APPARATUS FOR NMR MEASUREMENT OF WETTABILITY

This patent application claims priority from U.S. Provisional Application No. 60/366,314 filed on Mar. 21, 2002, which is incorporated herein by reference in its entirety.

FIELD OF THE INVENTION

This invention relates to investigations of porous media containing two or more fluids, and more particularly relates to nuclear magnetic resonance (NMR) methods and apparatuses for determining the wettability of saturated subsurface rock.

BACKGROUND

NMR has been a common laboratory technique for over forty years and has become an important tool in formation evaluation. General background of NMR well logging can be found, for example, in U.S. Pat. No. 5,023,551 to Kleinberg et al., which is assigned to the same assignee as the present invention and herein incorporated by reference in its entirety.

NMR relies upon the fact that the nuclei of many chemical elements have angular momentum ("spin") and a magnetic moment. In an externally applied static magnetic field, the spins of nuclei align themselves along the direction of the static field. This equilibrium situation can be disturbed by a pulse of an oscillating magnetic field (e.g., a radio frequency (rf) pulse) that tips the spins away from the static field direction. The angle through which the spins are tipped is given by $\theta = \gamma B_1 t_P/2$, where $\gamma$ is the gyromagnetic ratio, $B_1$ is the linearly polarized oscillating field strength, and $t_P$ is the duration of the pulse. Tipping pulses of 90 and 180 degrees are most common.

After tipping, two things occur simultaneously. First, the spins precess around the direction of the static field at the Larmor frequency, given by $\omega_0 = \gamma B_0$, where $B_0$ is the strength of the static field and $\gamma$ is the gyromagnetic ratio. For hydrogen nuclei, $\gamma/2\pi = 4258$ Hz/Gauss, so, for example, in a frequency of 1 MHz. Second, the spins return to the equilibrium direction according to a decay time, $T_1$, which is known as the spin-lattice relaxation time.

Also associated with the spin of molecular nuclei is a second relaxation time, $T_2$, called the spin-spin relaxation time. At the end of a 90-degree tipping pulse, all the spins are pointed in a common direction perpendicular, or transverse, to the static field, and they all precess at the Larmor frequency. However, due to small fluctuations in the static field induced by other spins or paramagnetic impurities, the spins precess at slightly different frequencies, and the transverse magnetization dephases with a time constant $T_2$.

A standard technique for measuring $T_2$, both in the laboratory and in well logging, uses an RF pulse sequence known as the CPMG (Carr-Purcell-Meiboom-Gill) sequence. As is well known, after a wait time that precedes each pulse sequence, a 90 degree pulse causes the spins to start precessing. Then, at time $t_E/2$, a 180 degree pulse is applied that keeps the spins in the transverse plane but causes the spins, which have been dephasing to refocus at a time $t_E$ after the initial 90 degree pulse. By repeatedly manipulating the spins using a series of 180 degree pulses, a series of "spin echoes" appear. The train of echoes is measured and processed to determine the irreversible dephasing, $T_2$.

In rock formations, such as in a borehole environment, $T_2$ for hydrogen-containing fluids (such as water, oil, gas) can have significant contributions due to surface relaxation, bulk relaxation, and diffusion effects, i.e., $$\frac{1}{T_2} = \frac{1}{T_{2,surface}} + \frac{1}{T_{2,bulk}} + \frac{1}{T_{2,diffusion}} \quad (1)$$

Each of these contributions provides some information about the rock formation and/or about the fluid in the rock formation. For example, in a wetting phase, the surface relaxation contribution, $T_{2,surface}$, dominates the distribution of observed distribution of decay times, $f(T_2)$. Spins relax predominantly due to collisions with the grain surface, with the collision rate being inversely proportional to the pore size. This means that the observed relaxation time is roughly proportional to the pore size, i.e., $1/T_{2,surface} = \rho_2 S/V_P$, where $S$ is the surface area of the pore, $V_P$ is the pore volume, and $\rho_2$ is the surface relaxivity of the rock, a phenomenological parameter that indicates how relaxing the surface is. Thus, for a wetting phase, the observed $f(T_2)$ provides information about pore size distribution. In a nonwetting phase, surface relaxation becomes negligible and bulk relaxation, which is related to viscosity, dominates the observed $f(T_2)$. Thus, for a nonwetting phase, the observed $f(T_2)$ provides information about viscosity.

In a uniform static magnetic field, each spin will experience the same magnetic field strength regardless of its position within the static field, and diffusion will not contribute to the observed $f(T_2)$. In a magnetic field gradient, however, each spin will experience different magnetic field strengths as it diffuses through the static field. The Larmor frequencies of the diffusing spins become time dependent, and the series of 180 degree pulses cannot refocus the Spills completely, leading to an additional decay signal. This additional decay signal is proportional to the diffusion coefficient, D, of the fluid and to the square of the gradient strength, g, and the square of the echo spacing, $t_E$ i.e., $$\frac{1}{T_{2,diffusion}} = \frac{1}{12}\gamma^2 g^2 D t_E^2 \quad (2)$$

Because the diffusion coefficient provides an indication of fluid type, measurement of the diffusion effects on $f(T_2)$ can be used as the basis for determining the types of fluids in a rock formation.

Certain NMR measurements of diffusion involve changing the echo spacing, $t_E$, in a standard CPMG sequence, and thus the amount of diffusion the spins undergo between echoes, and then comparing the measured relaxations. FIGS. 1A and 1B generally illustrate this approach. FIG. 1A shows two CPMG sequences with different echo spacings, $t_1$ and $t_2$, where $t_2$ is longer than $t_1$. As the echo spacing increases, the spins diffuse further between echoes, and the measured relaxation times will decrease depending on the diffusion coefficient of the fluid, as given in Equation (2) above. FIG. 1B shows the relaxation distributions, $f(T_2)$, for an oil and water determined from the two sets of echoes acquired from the two CPMG sequences illustrated in FIG. 1A. As seen in FIG. 1B, the relaxation distribution with the longer echo spacing, $t_2$, is shifted to lower relaxation times, $T_2$, relative to the relaxation distribution with the shorter echo spacing, $t_1$. The size of the shift is proportional to the size of the diffusion coefficient, as indicated by arrows 1 and 2. The shift of $f(T_2)$ for a fluid with a small diffusion coefficient 1, such as heavy oil, is smaller than the shift for a fluid with a larger diffusion coefficient 2, such as water or natural gas.

While such NMR diffusion measurements can be useful, they suffer from a number of drawbacks. For example, for a given acquisition time, the two CPMG sequences will not have the same number of echoes. The CPMG sequence with longer echo spacing will have a smaller number of echoes available, so will suffer from lower signal to noise and lower data quality in general. In addition, relaxation distributions for different fluids often overlap, at least partially, making it difficult to identify shifts of individual relaxation times. In cases where the diffusion coefficients for different fluids are small, the shifts may be difficult to distinguish.

Commonly owned U.S. patent application Ser. No. 09/723,803, incorporated by reference herein in its entirety, discloses a method called diffusion-editing that is useful in separating diffusion and relaxation effect for determining saturation and pore geometry. However, to date, there has been no effective method of determining the wettability (an important parameter that strongly influences the flow of fluids in a porous media) of a porous media wherein the effects of diffusion and relaxation are adequately accounted for.

Accordingly, it is an object of the present invention to provide a method for determining the wettability of a porous media wherein diffusion and relaxation effects are adequately accounted for.

SUMMARY OF THE INVENTION

The present invention relates to a method for determining the wettability of a porous media. While the examples provided relate to oil/water saturated earth formations, the methodology presented herein may be applied to any porous media, such as bone, plant, food, wood or molecular sieves, etc., having at least two fluids, such as gases, liquids or mixtures thereof.

In one embodiment of the present invention, a method of extracting information about a porous media containing two or more fluids is disclosed comprising: a) applying a magnetic field gradient (pulsed or static) to the fluids; b) applying a first series of oscillating magnetic field pulses to the fluids, wherein the first series of pulses has an initial magnetic field pulse, a first portion followed by a second portion; c) detecting magnetic resonance signals generated in (b); d) after a wait time, applying a second series of oscillating magnetic field pulses to the fluids, wherein the second series of pulses has an initial magnetic field pulse, a third portion (i.e., a modified version of the first portion) followed by the previously applied second portion; e) detecting magnetic resonance signals generated in (d); and f) analyzing the detected signals to determine the wettability of the porous media. In this way the detected signals may be analyzed in a manner that allows for the separation of diffusion and relaxation effects and their correlation. This allows the determination of the diffusion coefficient for the fluids as well as the determination of the different components of the fluids. One skilled in the art would recognize that there are scenarios wherein the amplitude of the detected signals generated in (b) or (d) is zero. Accordingly, there may be no signal to detect in (c) or (e).

One or more additional series of pulses may be applied in the same manner. Each series of pulses is a modification of the second series wherein the third portion of the series is modified and the same second portion is applied. In this manner, a two-dimensional function can be developed, and, if desired, a 3-D plot or map created. Further, a calibration function describing the relationship between diffusion and relaxation that is representative of at least one of the fluids in the porous media can be developed to assist in wettability determination. For the purposes of this invention, the calibration function is the relationship between diffusion and relaxation of the representative fluid outside of the porous media (i.e., the fluid in bulk). One skilled in the art would recognize that the relaxation component of the diffusion-relaxation relationship of the bulk fluid may have contributions other than bulk relaxation. The calibration function is con-elated to the two-dimensional function to determine the wettability of the porous media.

The method of the present invention is particularly useful in assessing the wettability of an earth formation. This measurement may be performed downhole or on core samples taken to a surface laboratory.

In one non-limiting embodiment, the present method is implemented in a logging apparatus comprised of a logging tool that is moveable through a borehole is coupled to a processor. The processor is programmed with instructions which, when executed by the processor cause the logging tool to: (i) generate a first series of oscillating magnetic field pulses to the region of earth formation, the first series having an initial magnetic field pulse, a first portion followed by a second portion; (ii) detect magnetic resonance signals produced from the region of earth formation; (iii) after a wait time, apply a second series of oscillating magnetic field pulses to the region of earth formation, the second series having an initial magnetic field pulse, a third portion followed by the second portion; (iv) detect magnetic resonance signals produced from the region of earth formation. The instructions further cause the processor to analyze the detected magnetic resonance signals to determine the wettability of the region of investigation. The processor may be programmed to repeat the series of pulses, each repetition having a modified third portion, one or more times to develop a two-dimensional D-$T_2$ function. The calibration function may be pre-programmed into the processor for correlation with the developed two-dimensional function. In this manner, the wettability of the region of earth formation under investigation may be determined.

Further features and applications of the present invention will become more readily apparent from the figures and detailed description that follows.

BRIEF DESCRIPTION OF THE DRAWINGS

FIGS. 4A, 4B, and 4C is a 3-D map based on the two-dimensional D-$T_2$ function for partially saturated Berea sandstone.

DETAILED DESCRIPTION OF THE INVENTION

Diffusion-Editing Methodology

Figure 1A:
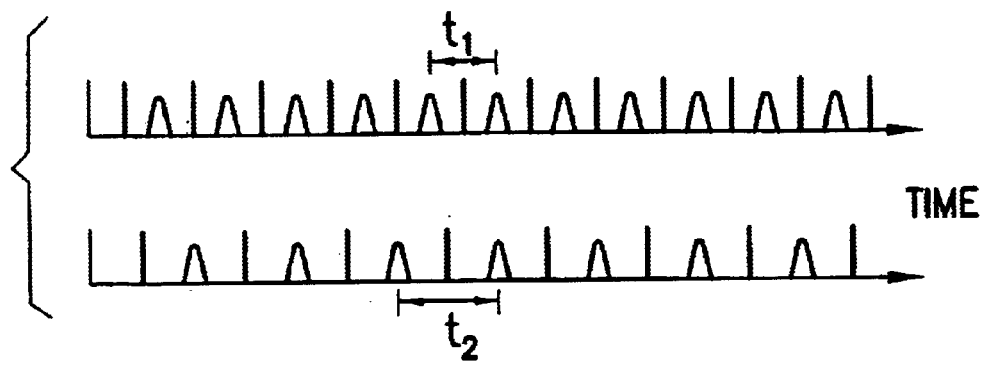
FIGS. 1A and 1B, taken together, illustrate a NMR measurement and $T_2$ distributions obtained therefrom according to the prior art.
Figure 1B:
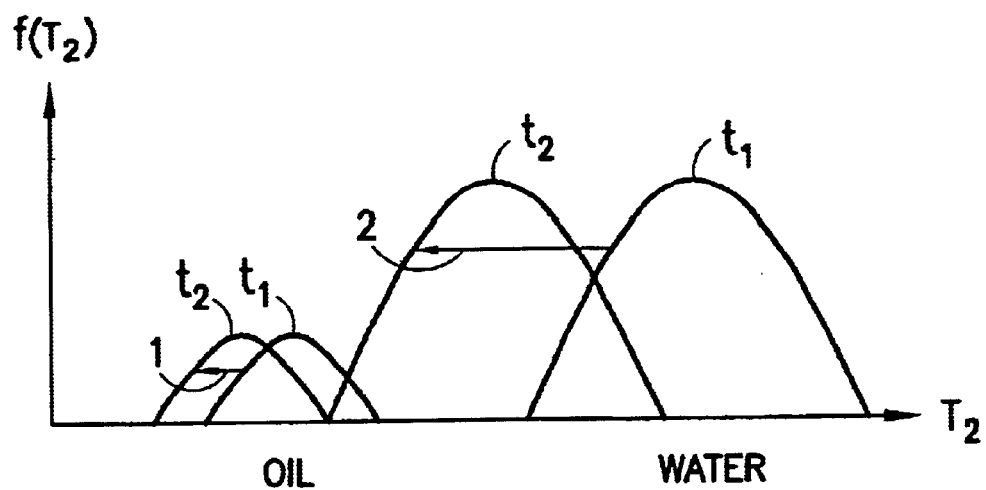
Figure 2A:
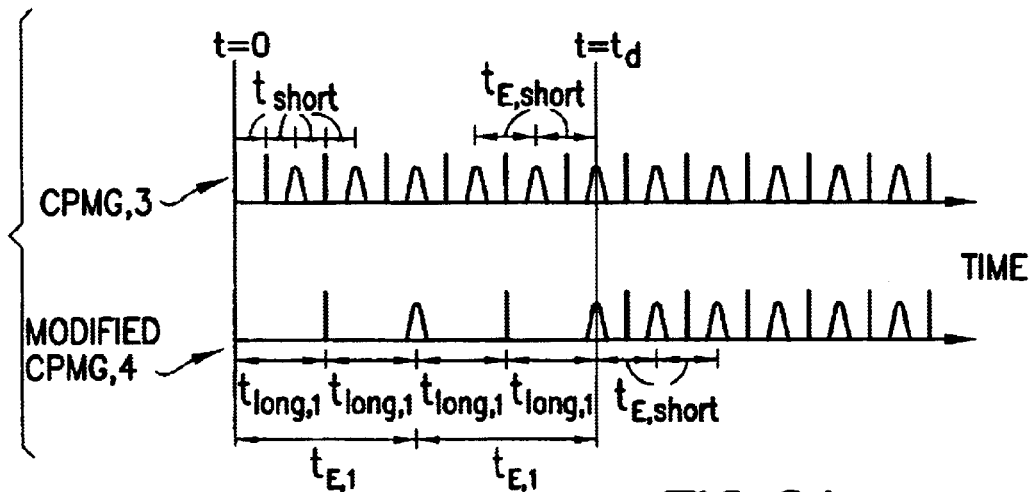
FIGS. 2A, 2B, and 2C, taken together, illustrate one embodiment of a NMR measurement and $T_2$ distributions obtained therefrom according to the diffusion-editing technique.
Figure 2B:
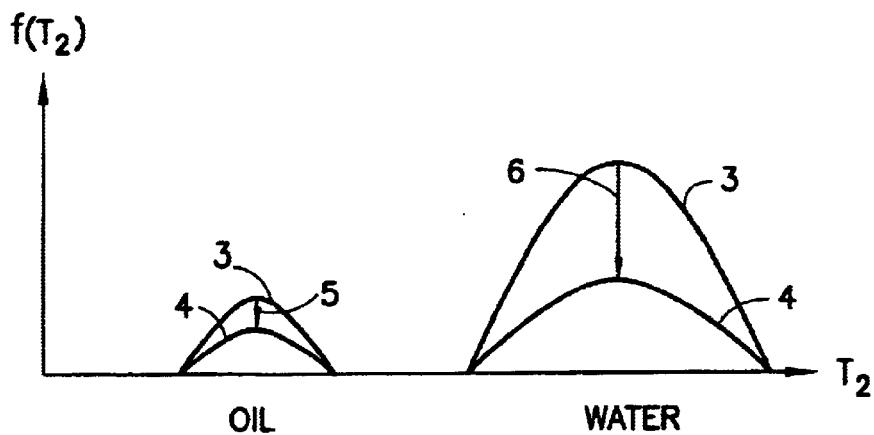
Figure 2C:
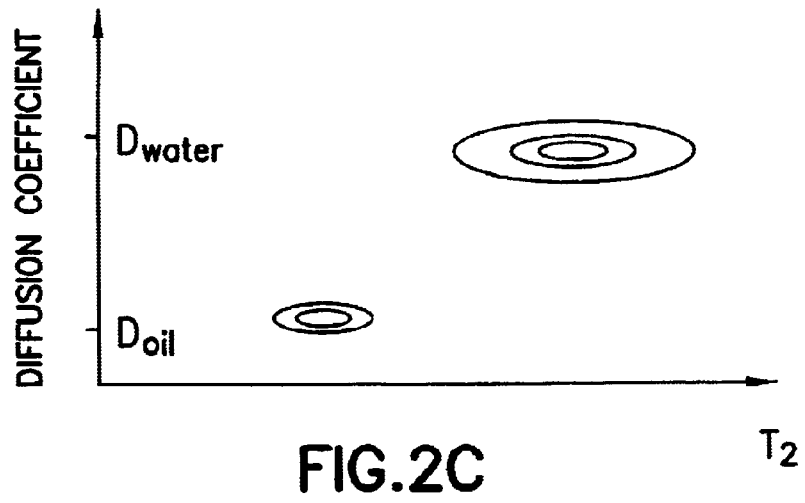

The present invention discloses method that allows a more robust extraction of wettability of a porous media. FIGS. 2A, 2B, and 2C describe the diffusion-editing technique, which is further described in commonly owned U.S. Pat. No. 6,462,542 and U.S. patent application Ser. No. 09/528,881, (now U.S. Pat. No. 6,522,136), Ser. No. 09/723,803 (now U.S. Pat. No. 6,570,382) and Ser. No. 10/318,798 as well as the following articles: Hürlimann et al., "The Diffusion-Spin Relaxation Time Distribution as an Experimental Probe to Characterize Fluid Mixtures in Porous Media," *J. Chem. Phys.* 117, 10223–10232 (2002); Hürlimann, et al., "Diffusion-Editing: New NMR Measurement of Saturation and Pore Geometry," SPWLA Proc. 43$^{rd}$ Annual Logging Symposium, Oiso, Japan, Paper FFF (2002); Hürlimann, et al., "Quantitative Measurement of Two-Dimensional Distribution Functions of Diffusion and Relaxation in Grossly Inhomogeneous Fields," *J. Mag. Reson.*, 157, 31–42 (2002). All of these patents, patent applications and articles are incorporated by reference herein in their entireties.

One embodiment of the present invention is shown in FIG. 2A wherein the first sequence is the standard CPMG sequence with minimal echo spacing $t_E$. In the second sequence, the first two echo spacings are increased to $t_{E,long}$, and then followed by a long train of 180 degree pulses with identical echo spacings $t_E$ as ill the first sequence. While it is preferred that two echo spacings are increased, only one or additional echo spacings may also be increased to $t_{E,long}$.

As shown in FIG. 2A, measurements with the diffusion-editing sequence are compared with measurements using the conventional CPMG sequence. In the diffusion-editing sequence, the first two echo spacings are increased. The echoes after time $t_d$ are used to calculate the $T_2$ distributions for the two measurements, as shown in FIG. 2B. The relaxation times are identical in both passes, but relative signal amplitudes depend on diffusion. The larger the diffusion coefficient is, the larger the ratio of amplitudes between the distributions. As shown in FIG. 2C, the data can be expressed as a diffusion-$T_2$ map based on the two-dimensional diffusion-$T_2$ function (i.e. 3-D plot).

The initial time $t_d$ is used to edit the amplitude of the signal according to diffusion. After $t_d$, the two pulse sequences are identical. The observed relaxation times after t>$t_d$ are identical for both sequences shown in FIG. 2B. However, the relative amplitude of each $T_2$ component depends on the extra diffusive decay during the interval $t_d$. Compared to the first sequence, the signal of the second sequence has an amplitude that is diffusion-edited at $t_d$ according to the diffusion coefficient of the fluid. The ratio of the amplitudes of the $T_2$ distribution depends only on diffusion because surface and bulk relaxation during $t_d$ affects the signal in the two sequences the same way. The signal for times t larger than $t_d$ is given by:

$$M(t_{E,long}, t) \approx \int\int dDdT_2 f(D, T_2) e^{-t/T_2} \exp\left\{-\frac{1}{6}\gamma^2 g^2 D t_{E,long}^3\right\} \quad (4)$$

Here $f(D,T_2)$ is the two dimensional diffusion-$T_2$ probability density function. Note that the kernel in Equation (4) separates into two terms: (1) $e^{-t/T_2}$ only depends on the experimental time t and the parameter $T_2$; and (2)

$$\exp\left\{-\frac{1}{6}\gamma^2 g^2 D t_{E,long}^3\right\}$$

only depends on the different (increased) experimental time $t_{E,long}$ and the parameter D. By measuring the signal for different initial echo spacings $t_{E,long}$, it is therefore possible to extract diffusion coefficient and relaxation time separately.

In practice, the echo spacing after $t_d$ is chosen as short as possible for optimal signal-to-noise ratio and to minimize the diffusion effects on the measured values of $T_2$. If passes with two different values of initial echo spacings are used (as shown in FIGS. 2A, 2B, and 2C), it is possible to extract at every relaxation time $T_2$ an average diffusion coefficient.

If more than two different initial echo spacings are used, it is possible to extract a distribution of diffusion coefficients for every $T_2$, resulting in a full D-$T_2$ map. Examples are shown below. There is a straightforward trade-off between the resolution in D and the required number of measurements with different diffusion-editing.

In essence, the minimum diffusion-edit pulse sequence may be described as;

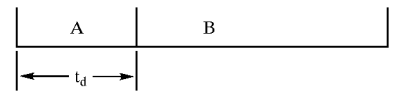

(5a)

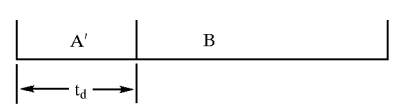

(5b)

One or more additional sequences may be used to develop a 2-D function and thereby create a 3-D plot (as shown in FIG. 4A):

(5c)

(5d)

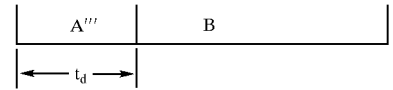

Diffusion-Editing to Determine Wettability

Wettability is an important parameter that strongly influences the flow of immiscible fluids (such as oil and water) in a porous media. For short echo spacings, the measured $T_2$ decay rate has contributions from $T_{2,bulk}$ and $T_{2, surface}$. The bulk decay rate is a characteristic of the fluid filling the pore space. If the fluid molecules are within a few Angstroms of the solid grain surfaces, paramagnetic impurities in the grains will relax the spins. This surface relaxation is typically the dominant relaxation for the wetting phase. For the non-wetting phase, it is not significant because the spins cannot get close enough to the relaxing surfaces for the surface to have an effect on the spin.

Wettability can be inferred from the presence or absence of surface relaxation to the overall $T_2$ relaxation for a given phase. Using conventional techniques, it is difficult to separate out the two contributions in Equation (1). The two phases can overlap and the bulk relaxation of the hydrocarbon is not known a priori. Using the method of the present invention, the two contributions may be separated to infer the wettability of the sample.

As discussed in Morriss et al.'s "Hydrocarbon Saturation and Viscosity Estimation from NMR Logging in the Belridge Diatomite," Trans. SPWLA 35$^{th}$ Annual Logging Symposium, page C (1994) (incorporated by reference herein in its entirety), bulk relaxation is proportionally to the viscosity of the fluid:

$$T_{2,bulk} \propto \eta^{-1} \quad (6)$$

With NMR, the diffusion coefficient $D_0$ may be measured and is inversely proportional to viscosity as shown by the Stokes formula. Therefore, the bulk relaxation time, $T_{2,bulk}$, is to the first order directly proportional to the diffusion coefficient.

$$T_{2,bulk} = \alpha D_0 \quad (7)$$

Figure 3B:
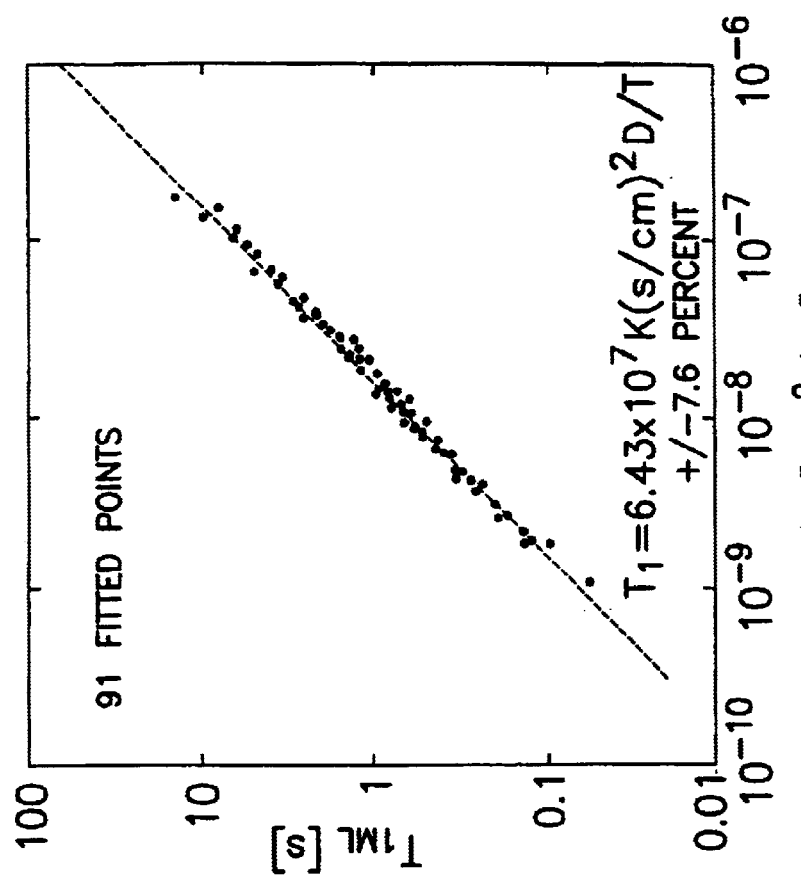
FIGS. 3A and 3B are graphical illustrations of the correlation of bulk relaxation time, $T_1$, with molecular diffusion coefficient, D.
Figure 3A:
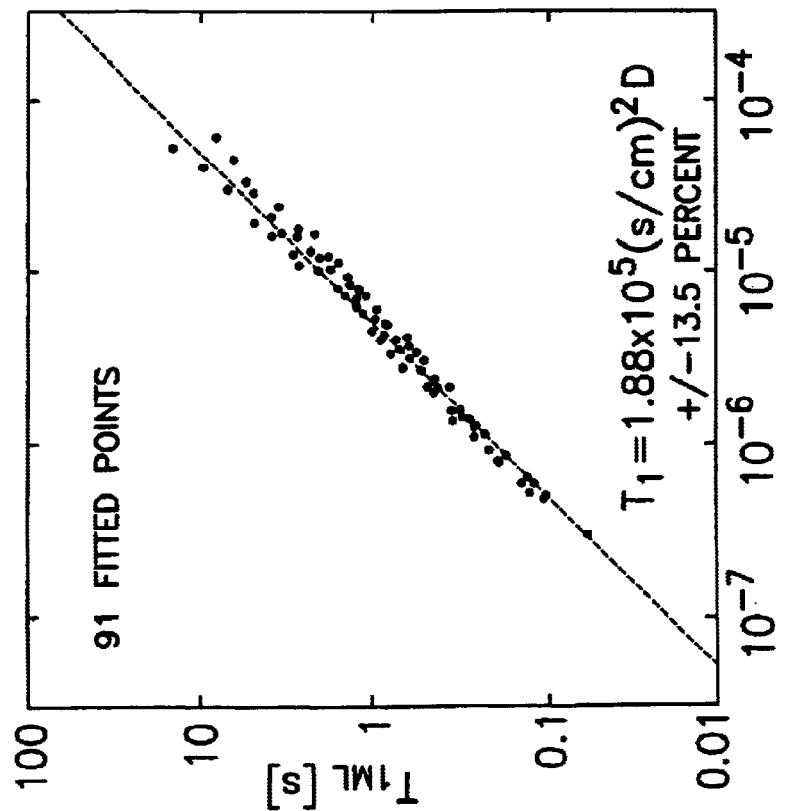

The relationship between $D_0$ and $T_{1,bulk}$ was measured on a large number of hydrocarbon samples and at different temperatures, as summarized in FIGS. 3A and 3B. In these samples, $T_{1,bulk}$ was equal to $T_{2,bulk}$. This data shows that Equation (7) is well fulfilled and the constant, $\alpha$, is given by $$\alpha = 2.14 \times 10^5 \ s^2/cm^2 \left(\frac{300K}{T}\right) \quad (8)$$

Results in Morriss et al. and in FIGS. 3A and 3B were obtained with the log mean values of the relaxation times. For crude oils, the description of the full relaxation and diffusion behavior requires distributions of relaxation times and diffusion coefficients. Preliminary measurements on a range of crude oils have shown that to first order, the relationship of Equation (7) holds not only for the log mean values but also for each component of the distribution.

For crude oils which have a high concentration of paramagnetic impurities, such as vanadium and chromium, the value of $\alpha$ will deviate from Equation (8). In this case, the relaxation times associated with a given diffusion coefficient are shorter than predicted by Equations (7) and (8) and $\alpha$ has to determined separately.

When this information is correlated with the 2-D function, $f(D,T_2)$ (i.e., overlaid on a 3-D plot), the wettability of the porous media may be determined. The measured diffusion coefficient gives mainly information about the fluid property. The measured value of D is also affected somewhat by the presence of the pore walls because the diffusion is restricted. This will lower the measured diffusion coefficients compared to the molecular diffusion coefficient of the fluids. Using large gradients and short diffusion encoding times, this effect can be minimized.

FIGS. 4A, 4B and 4C show the data of Hürlimann et al.'s "Diffusion-editing: New Measurements of Saturation and Pore Geometry with NMR Tools," Forum of the 20$^{th}$ Annual Schlumberger Oilfield Symposium, Dubai, Sep. 18–20, 2000. There are clearly two separate peaks, both centered at around $T_2$=250 ms but with different diffusion coefficients. From the measured diffusion coefficient, the upper peak is determined to be the water signal. The lower peak therefore is the oil signal. In this case, the diffusion coefficient of the oil (the immiscible fluid in this sample) is independently known and agrees with the measured value.

The dashed line shows the relationship between diffusion coefficient and bulk relaxation time, given in Equation (7), and represents the slope and intercept of the $D$-$T_{1,bulk}$ graph of FIG. 3A. The oil peak in FIG. 4A lies exactly on this line, indicating that the relaxation is completely dominated by the bulk relaxation of the fluid and there is no surface relaxation. Therefore, this is the non-wetting phase of oil and the rock is water-wet.

In contrast to the oil peak, the water peak clearly lies to the left of the dashed line. This indicates that the relaxation is dominated by surface relaxation. This confirms that water is the wetting phase in this case.

The diffusion-editing technique allows the full separation of diffusion and relaxation effects in NMR measurements and therefore allows more accurate determination of wettability.

Note that FIGS. 3A and 3B were developed using mineral oil, which was believed to be a good representation of the fluid present in the saturated core samples of the Hürlimann reference. One skilled in the art may choose to use other samples as a calibration dependent on the fluid(s) in question. Also note that one may choose to develop the $D$-$T_{1,bulk}$ relationship concurrent with the development of the $D$-$T_2$ function.

Laboratory Experiment

The concept of diffusion-editing in the laboratory was performed by taking advantage of the fringefield of an existing superconducting magnet that is used as an NMR imager with a central field of 20 kGauss. In conventional operation, the sample is carefully placed in the center of the magnet. For the present application, the sample was placed instead 50 cm outside the front plate. At this location, the field and gradient are comparable to NMR logging tools. In this case, the field was about 414 Gauss, corresponding to a Larmor frequency of 1.764 MHz, and the gradient of the magnetic field was substantially uniform with a strength of about 13.2 G/cm. The sample was placed inside a solenoid rf coil, tuned to the Larmor frequency. Samples that were typically 2 cm in diameter and 3.75 cm long were used.

The expressions for diffusion given in Equations (3) and (4) are well known but are calibrated for signals originating from the middle of the excited slice. Away from the center of the slice, the signal decays faster. In NMR logging, signals are obtained from the whole slice and the effects of the grossly inhomogeneous fields of the tools should be included. The detailed analysis by Hürlimann in "Diffusion and relaxation effects in general stray field NMR experiments," *J. Magn. Reson.* 148, 367–378 (2001) (incorporated by reference herein in its entirety) shows that even in fields with a constant gradient, diffusion leads to multi-exponential decays. For the diffusion-editing sequence shown in FIG. 2A, operation in inhomogeneous fields leads to a straightforward modification—the single exponential diffusive attenuation term in Equation (4) is replaced by two terms. The first one describes the contributions from the direct echo coherence pathway, the second one accounts for the contributions from the stimulated echo coherence pathways. For $t>t_d$, the modified expression of Equation (4) valid in inhomogeneous fields becomes $$M(t_{E,long}, t) = \int\int dD dT_2 f(D, T_2) e^{-t/T_2} \times \qquad (9)$$

$$\left[ a_d \exp\left\{-\frac{1}{6}\gamma^2 g^2 D t_{E,long}^3\right\} + a_s \exp\left\{-\frac{1}{3}\gamma^2 g^2 D t_{E,long}^3\right\} \right]$$

The prefactors $a_d$ and $a_s$ are tool specific calibration constants that are otherwise only affected by the detection bandwidth. For the lab measurements, $a_d$=0.59 and $a_s$=0.20.

In the case of a distribution of gradients $f(g)$, the diffusion kernel in the square bracket of Equation (9) is replaced by:

$$I_D(D, t_{E,long}^3) = \qquad (10)$$

$$\int dg f(g) \left[ a_d \exp\left\{-\frac{1}{6}\gamma^2 g^2 D t_{E,long}^3\right\} + a_s \exp\left\{-\frac{1}{3}\gamma^2 g^2 D t_{E,long}^3\right\} \right]$$

As in Equations (4) and (9), the diffusion kernel $I_D$ remains a function of $Dt^3_{E,long}$ and diffusion still fully separates with relaxation. In practice $I_D$ is determined by calibration with a fluid of known diffusion coefficient, such as water.

As with the standard CPMG sequence, the amplitudes of the first few echoes measured with the diffusion-editing sequence are affected by the off-resonance effects and have to be multiplied by a fixed spin dynamics correction.

This analysis demonstrates that the complications associated with strongly inhomogeneous fields can be fully accounted for. The procedure to determine the two-dimensional diffusion-$T_2$ function, and the corresponding diffusion-$T_2$ maps, can be easily modified to take into account all of these effects as discussed below.

Laboratory Results

Figure 5A:
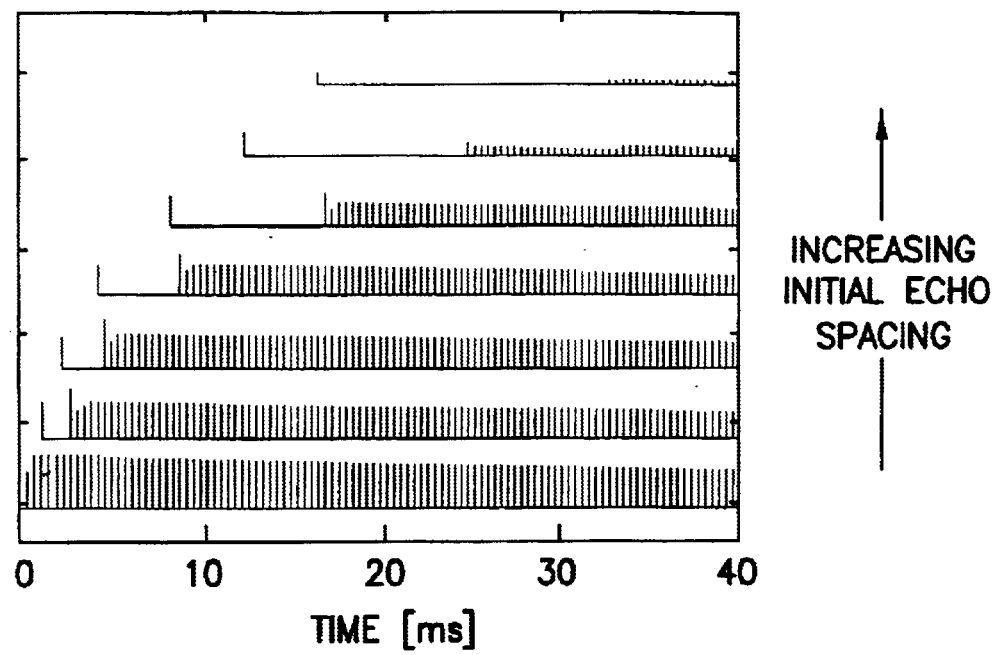
FIGS. 5A and 5B are graphical representations of diffusion-editing for (A) water and (B) oil.
Figure 5B:
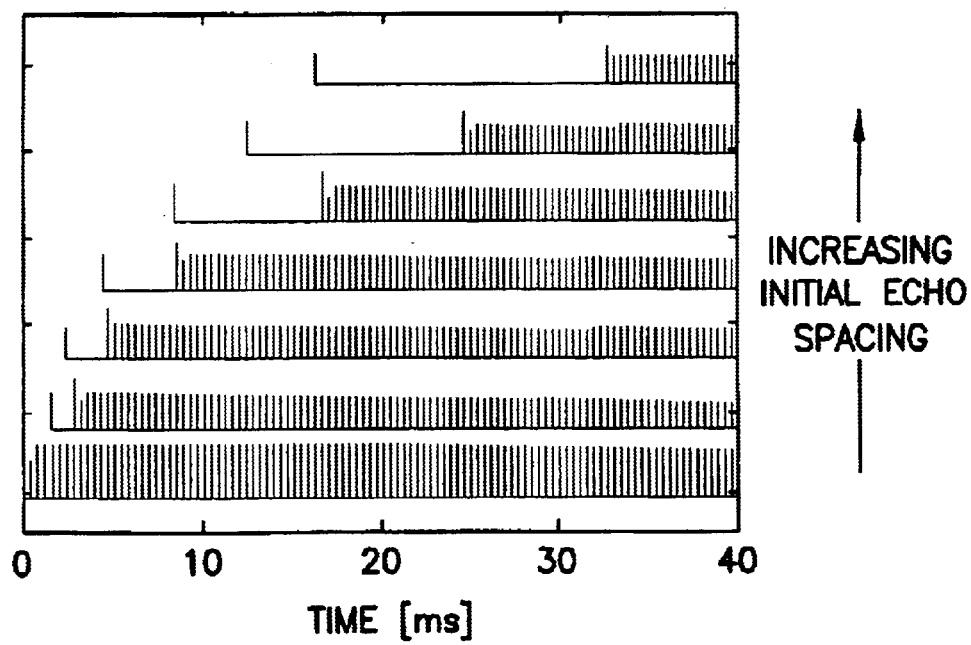

The diffusion-editing sequence was first tested on pure fluids. In FIGS. 5A and 5B, the first 40 ms of data for water (FIG. 5A) and S6 oil (FIG. 5B) are shown. The water was doped with $NiCl_2$ to reduce $T_2$ to 110 ms. The oil used in these experiments is S6, a proprietary mixture developed as viscosity standard, with a nominal viscosity of 6 cP. Both samples have roughly the same $T_2$, but the diffusion coefficient is about 20 times smaller for the oil than the water sample. This is clearly reflected in the data shown in FIGS. 5A and 5B. The traces for different first echo spacings are offset from each other. As the first two echo spacings are increased from the bottom to the top, the echo amplitudes of water (with large diffusion coefficient) decrease rapidly, whereas the echo amplitudes of oil (small diffusion coefficient) only decrease slightly. Accordingly, the amplitudes for the water data are attenuated much faster than for the oil. Note that the relaxation time of each trace is identical.

Figure 6:
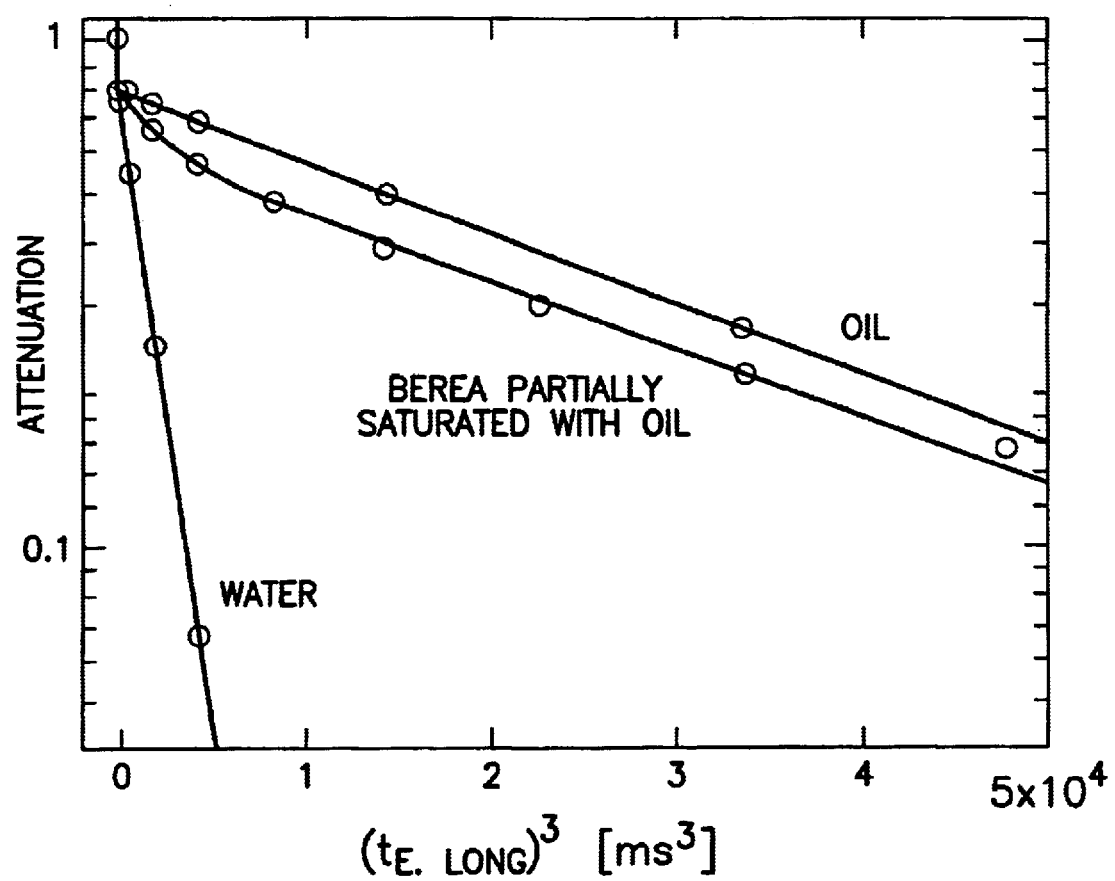
FIG. 6 is a graphical representation of attenuation due to diffusion-editing versus $t^3_{E,long}$.

This effect is analyzed quantitatively in FIG. 6. Echo amplitudes have been extracted from the acquired echo shapes by matched filtering. The circles represent the measured echo amplitudes at the time of twice the longest initial echo spacing, $t_d$, relative to the amplitude of the standard CPMG at the same time. The solid curves for water and oil are 1-parameter fits of the data to $0.59\exp\{-1/6\gamma^2 g^2 Dt_{E,long}^3\}+0.20\exp\{-1/3\gamma^2 g^2 Dt_{E,long}^3\}$, with the diffusion coefficient D the only unknown parameter. In both cases, the fits are excellent and $D_{water}$=2.5×10$^{-5}$ cm$^2$/s and $D_{oil}$=1.35× 10$^{-6}$ cm$^2$/s were extracted, in agreement with the expected diffusion coefficients of the fluids.

In an additional measurement, a core of Berea 100 was partially saturated with S6 oil using a high flow set-up. The data shown in FIG. 6 for the Berea sample is the relative amplitudes as the initial echo spacing $t_{E,long}$ is changed. There is an initial fast decay due to the diffusing water, followed by a slower decay due to the oil.

The attenuation was modeled as a simple superposition of a decay due to water and a decay due to oil. The line for the Berea sample is a 3-parameter fit of the data. The three fitting parameters are the water saturation, $S_{water}$, the effective diffusion coefficient for water, $D_{water}$, and the effective diffusion coefficient for oil, $D_{oil}$. From the fit to the data, it was determined that $S_{water}$=0.21, $D_{water}$=1.9×10$^{-5}$ cm$^2$/s, and $D_{oil}$=1.3×10$^{-6}$ cm$^2$/s. In the Berea sample, the oil saturation ($S_{oil}$) was equal to 0.79.

As expected, the extracted oil diffusion coefficient, $D_{oil}$, is close to the bulk diffusion coefficient of the pure fluid. In this water-wet rock, water is mainly occupying the small pores and diffusion is significantly restricted. For this reason, $D_{water}$ is reduced from the bulk diffusion coefficient of water.

The water saturation agrees with gravimetrical measurements. This demonstrates that with diffusion-editing measurements, saturation and diffusion coefficients of the two phases can be directly extracted from the data without having to make any assumptions about the relationship between relaxation and diffusion.

In FIG. 6, the analysis was limited to the relative initial amplitudes of the measured decay. By including the full data set, a much more powerful analysis is possible that results in the extraction of the two-dimensional diffusion-$T_2$ function, $f(D,T_2)$, and the corresponding map.

For this purpose, the standard one-dimensional algorithm that inverts magnetization decays into $T_2$ distributions has been extended to a multi-dimensional algorithm. Details are described in Venkataramanan, et al. "Solving Fredholm Integrals of the First Kind with Tensor Product Structure in 2 and 2.5 Dimensions," *IEEE Trans. Signal. Proc.*, 50 (Issue 5), (2002) (incorporated herein by reference in its entirety). First, taking advantage of the separable kernel, the data are compressed along each dimension using singular value decomposition. The original data that typically consist of 20,000 data point or more are thus compressed to about 40 data points. The density function $f(D,T_2)$ is estimated from the compressed data subject to the non-negativity constraint $f(D,T_2)$ greater than or equal to 0. Because the least-squares optimization problem is ill-conditioned, a smoothness function was imposed on $f(D,T_2)$ using zeroth-order regularization.

Using this procedure, the data was analyzed for the pure fluids and the diffusion-$T_2$ density functions, $f(D,T_2)$, was obtained with a single peak at the respective bulk diffusion coefficient and bulk $T_2$. The results for the sample of partially saturated Berea sandstone are shown in FIGS. 4A, 4B, and 4C. This distribution shows clearly two distinct peaks due to oil and water (FIGS. 4A, 4B, and 4C). The main peak with a diffusion coefficient of 10$^{-6}$ cm$^2$/s corresponds to the S6 oil. The water peak shows a higher diffusion coefficient but virtually the same relaxation time as the oil peak. Oil and water saturations correspond to the areas under the respective peaks and are found to be 0.78 and 0.22, respectively. The conventional $T_2$ distribution, obtained by integrating $f(D,T_2)$ over D is shown in FIG. 4B and consists of a single peak. Diffusion-editing is clearly able to determine that this single peak in the $T_2$ distribution has contributions from different fluids and to extract accurately the diffusion coefficients of each component. FIG. 4A shows a map based on the two-dimensional D-$T_2$ function.

In FIGS. 4A, 4B, and 4C, some of the contributions have an apparent diffusion coefficient that exceeds the bulk diffusion coefficient of water, $2.3 \times 10^{-5}$ cm$^2$/s. This is caused by internal gradients. In this rock, small regions with internal gradients in excess of 100 G/cm much larger than the applied gradient of 13 G/cm have been previously measured (as discussed in Hürlimann's article, "Effective Gradients in Porous Media due to Susceptibility Differences," *J. Magn. Reson.*, Volume 131, pages 232–240 (1998), incorporated by reference herein in its entirety). These regions occur in small pores that are filled with water. Based on Equation (9), a large internal gradient may be misinterpreted as high diffusion coefficient. Internal gradients in carbonates are typically insignificant.

FIELD EXAMPLE

Figure 7:
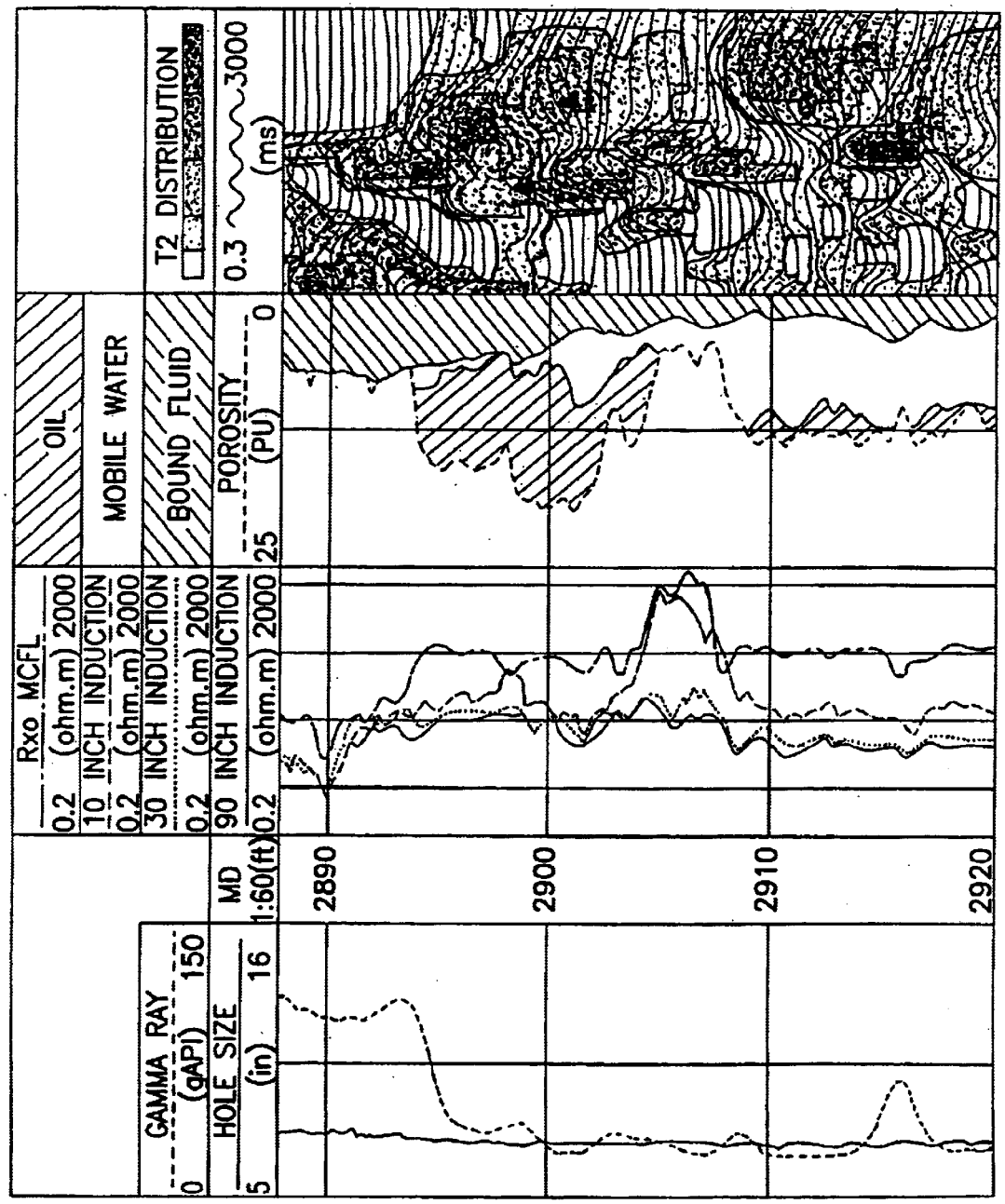
FIG. 7 is a series of depth logs over the oil-bearing interval in the test well.

The diffusion-editing technique was tested in a newly drilled well in the East Mt. Vernon in Indiana using a prototype of Schlumberger new-generation NMR wireline logging tool. FIG. 7 shows the depth logs in the oil-bearing interval. The NMR tool was positioned at about 2900 feet, in a zone that was expected to show a water saturation of 50%. A suite of data comprised of nine diffusion-editing sequences (FIGS. 2A, 2B and 2C) was acquired with spacings of the first two echoes varied between 2 ms and 12 ms in addition to the standard CPMG measurement. The right most track shows $T_2$ distributions obtained with Schlumberger's CMR-Plus tool.

Figure 8:
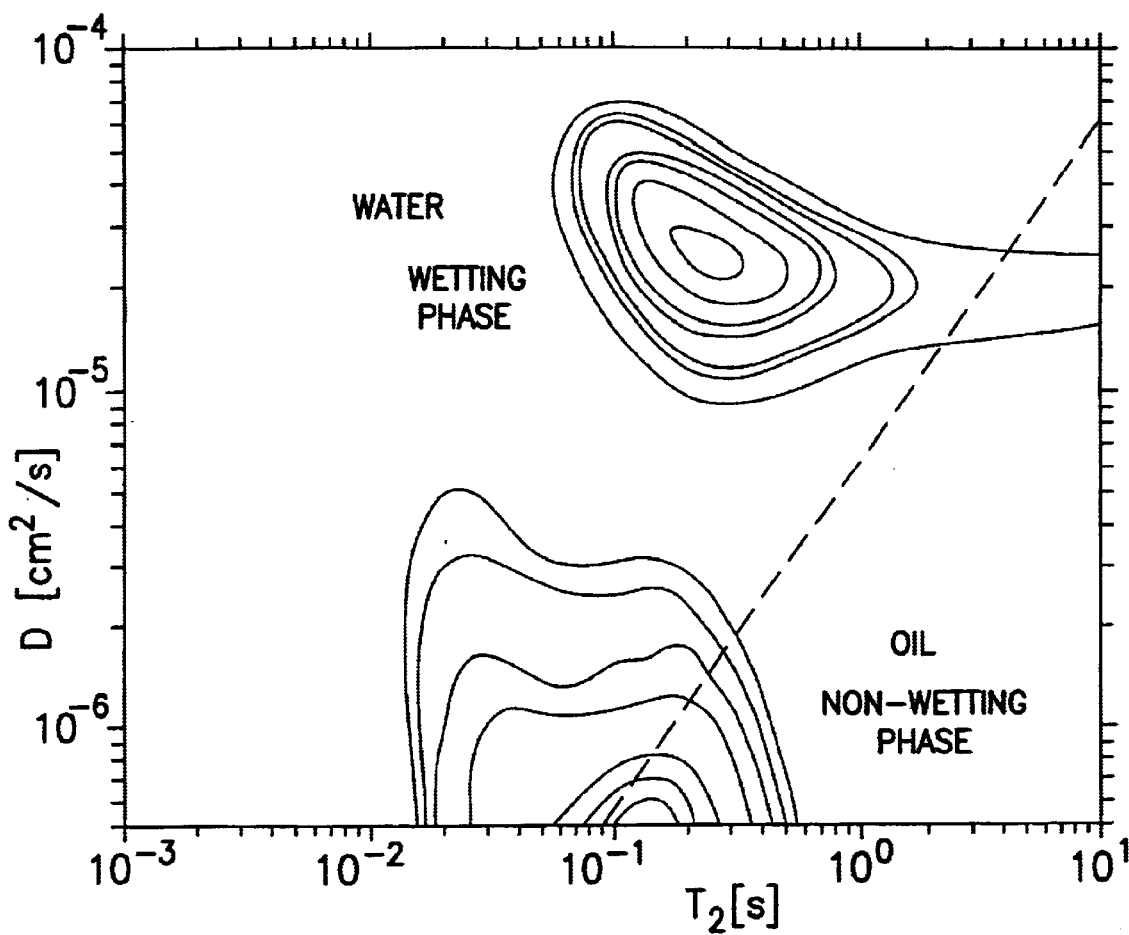
FIG. 8 is a 3-D map based on the two-dimensional D-$T_2$ function generated from station stop measurements with diffusion-editing sequences.

FIG. 8 shows the diffusion-relaxation map extracted from these measurements by the full two-dimensional inversion. The dashed line shows the relationship between diffusion coefficient and bulk relaxation time and represents the slope and intercept of the $D-T_{1,bulk}$ graph. There are two clearly separated peaks. Note that the $T_2$ distribution of the oil and water peaks significantly overlap. The diffusion coefficient of the upper peak is close to the molecular diffusion coefficient of water, and is therefore the water peak. The second peak, the oil peak, has a much smaller diffusion coefficient, indicated that the oil in this well has a moderate viscosity. The weight under each peak in FIG. 8 corresponds to the saturation of the respective phase. From this map, a water saturation of 53% was obtained.

From the position of the oil and water peak in the $D-T_2$ map, it may be inferred that this reservoir is predominantly water-wet. The measured relaxation time of the oil corresponds closely to the expected bulk relaxation time for an oil of the measured diffusion coefficient. Therefore, the relaxation of the oil is dominated by bulk relaxation rather than surface relaxation—a clear indication that the formation is water-wet. The relaxation of the water signal is clearly reduced from its bulk value and is dominated by surface relaxation, supporting this analysis.

Figure 9:
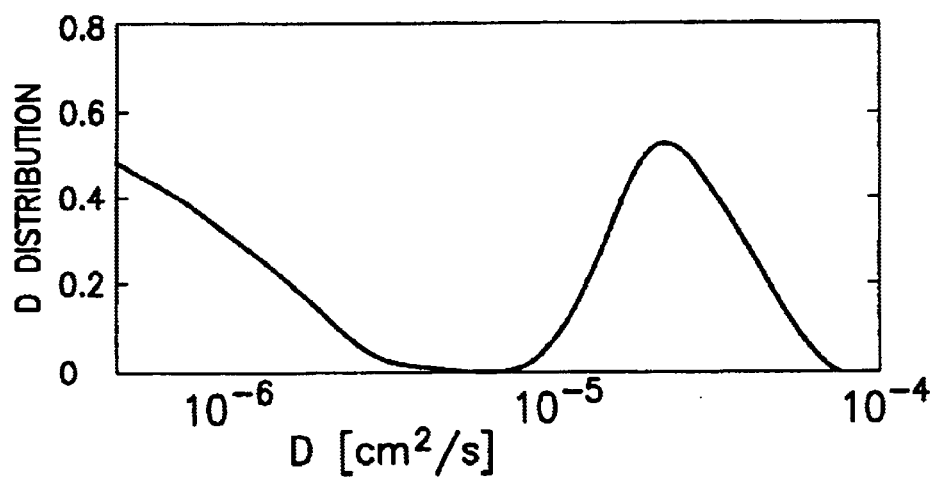
FIG. 9 is a graph showing the distribution of diffusion coefficients.

The two-dimensional map of FIG. 8 may be projected onto the diffusion axis to obtain the distribution of diffusion coefficients, $f(D)$, as shown in FIG. 9. The lower peak corresponds to the oil and a diffusion coefficient of about $10^{-6}$ cm$^2$/s may be inferred. The water peak shows an average diffusion coefficient of $2 \times 10^{-5}$ cm$^2$/s. This is reduced from the molecular diffusion coefficient of water at the reservoir temperature, $3 \times 10^{-5}$ cm$^2$/s, indicating somewhat restricted diffusion.

For cases with less favorable signal-to-noise ratios, it might not always be possible to perform a full two-dimension inversion and obtain clear separation of the water and oil peak. Under such circumstances in water-wet reservoirs, it might be preferable to use a constrained inversion to the diffusion-editing measurements. The MRF inversion described in Freedman et al.'s "A New NMR Method of Fluid Characterization in Reservoir Rocks: Experimental Confirmation and Simulation Results," paper SPE 63214 presented at the 2000 SPE Annual Technical Conference and Exhibition in Dallas, Tex. (revised and published in the SPE Journal, December 2001, pages 452–464) and in Freedman et al.'s "Wettability, Saturation, and Viscosity Using the Magnetic Resonance Fluid Characterization Method and New Diffusion-Editing Pulse Sequence," paper SPE 77397 presented at the 2002 SPE Annual Technical Conference and Exhibition in San Antonio, Tex. (incorporated by reference herein in their entireties) for the analysis of CPMG data acquired with different echo spacings has been adapted for the diffusion-editing application. In accordance with the present invention, results from the more restricted analysis on the diffusion-editing data are in excellent agreement with the full two-dimensional analysis.

Figure 10:
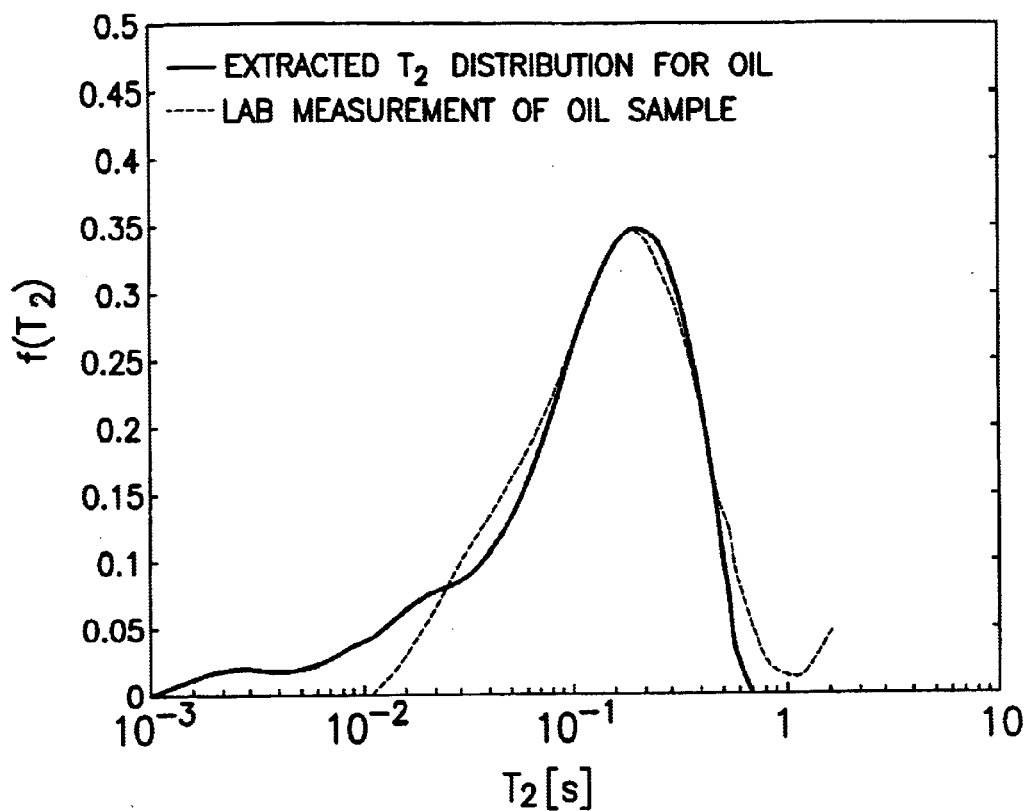
FIG. 10 is a graph showing a comparison of $T_2$ distributions of oil extracted from downhole diffusion-editing measurements and from lab CPMG measurements on a stock tank sample at reservoir temperature.

The oil in this reservoir has a very low gas-to-oil ratio (GOR) and its composition is essentially identical to that of dead stock tank oil. The NMR response of the sample was measured in the lab at the reservoir temperature. Using standard pulsed field gradient measurements at 2 MHz, we obtained a diffusion coefficient of $8 \times 10^{-7}$ cm$^2$/s, which is in excellent is in excellent agreement with the results shown in FIG. 9. In FIG. 10, the $T_2$ distributions from the oil measured in the lab and as inferred from the MRF inversion of the field data were compared. Again, the overall agreement is excellent.

Subsets of the diffusion-editing data were analyzed to test the minimum number of acquisition required. Suites containing as few as three diffusion-editing sequences plus the CPMG sequence provide results comparable to those shown in FIGS. 8, 9 and 10. This indicates that diffusion-editing depth logging is feasible and it is currently being field tested.

Techniques of fluid characterization based on NMR diffusion measurements are of limited use for components that relax very quickly. When the magnetization completely relaxes during the diffusion encoding time, it is not possible to infer the associated diffusion coefficient. The $D-T_2$ map shown in FIG. 7 is based on the analysis of signal 24 ms after the initial 90 degree pulse, twice the longest value of $t_{E,long}$. Comparison with the conventional analysis of the CPMG sequence shows that in this case, no fast components can be detected by a comparison of the porosity extracted from the analysis of the diffusion-edited measurements and the standard CPMG sequence shows that in this case, no fast components are present. The presence of fast relaxing components can be detected by a comparison of the porosity extracted from the analysis of the diffusion-edited measurements and the standard CPMG. In many cases, it is obvious whether the fast components should be classified as bound water or as oil of very high viscosity. In some cases, it might be advantageous to reanalyze the diffusion-editing data without including the data with longest values of $t_{E,long}$. This reduces the encoding time but limits the resolution to measure small diffusion coefficients.

Figure 11:
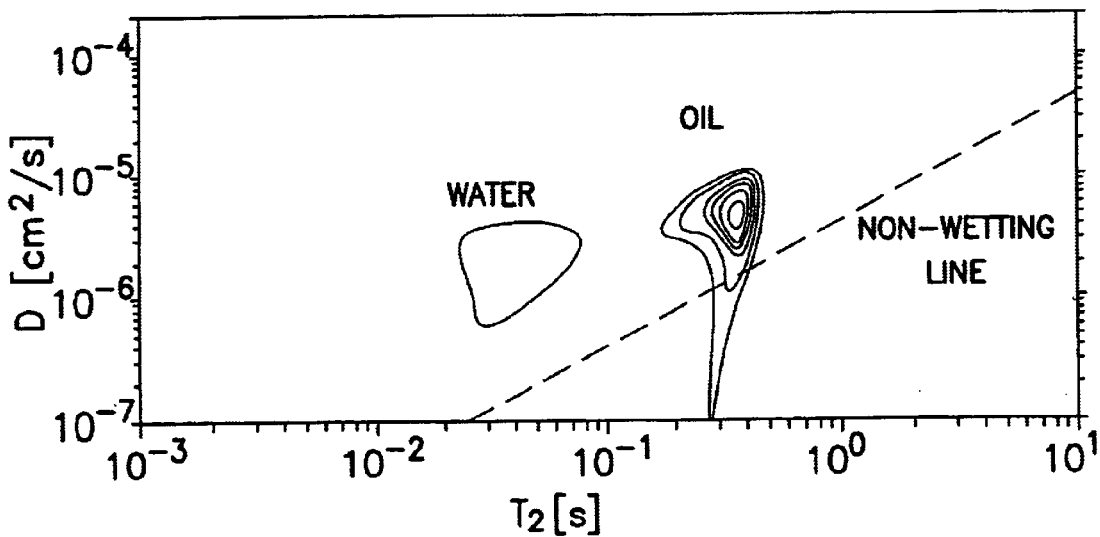
FIG. 11 is a map based on the two-dimensional D-$T_2$ function of a carbonate sample.

The same methodology was applied to a carbonate core sample saturated with a mixture of water and dodecane. FIG. 11 is a two-dimensional map developed using the diffusion-editing technique. The dashed line shows the relationship between diffusion coefficient and bulk relaxation time and represents the slope and intercept of the $D-T_{1,bulk}$ graph. In this sample, both the oil and water contributions are off of the $D-T_{1,bulk}$ line, indicating that both oil and water phases make direct contact with the pore walls. Accordingly, this sample has mixed wettability (i.e., is both water and oil wet).

Exemplary Apparatus

Figure 12:
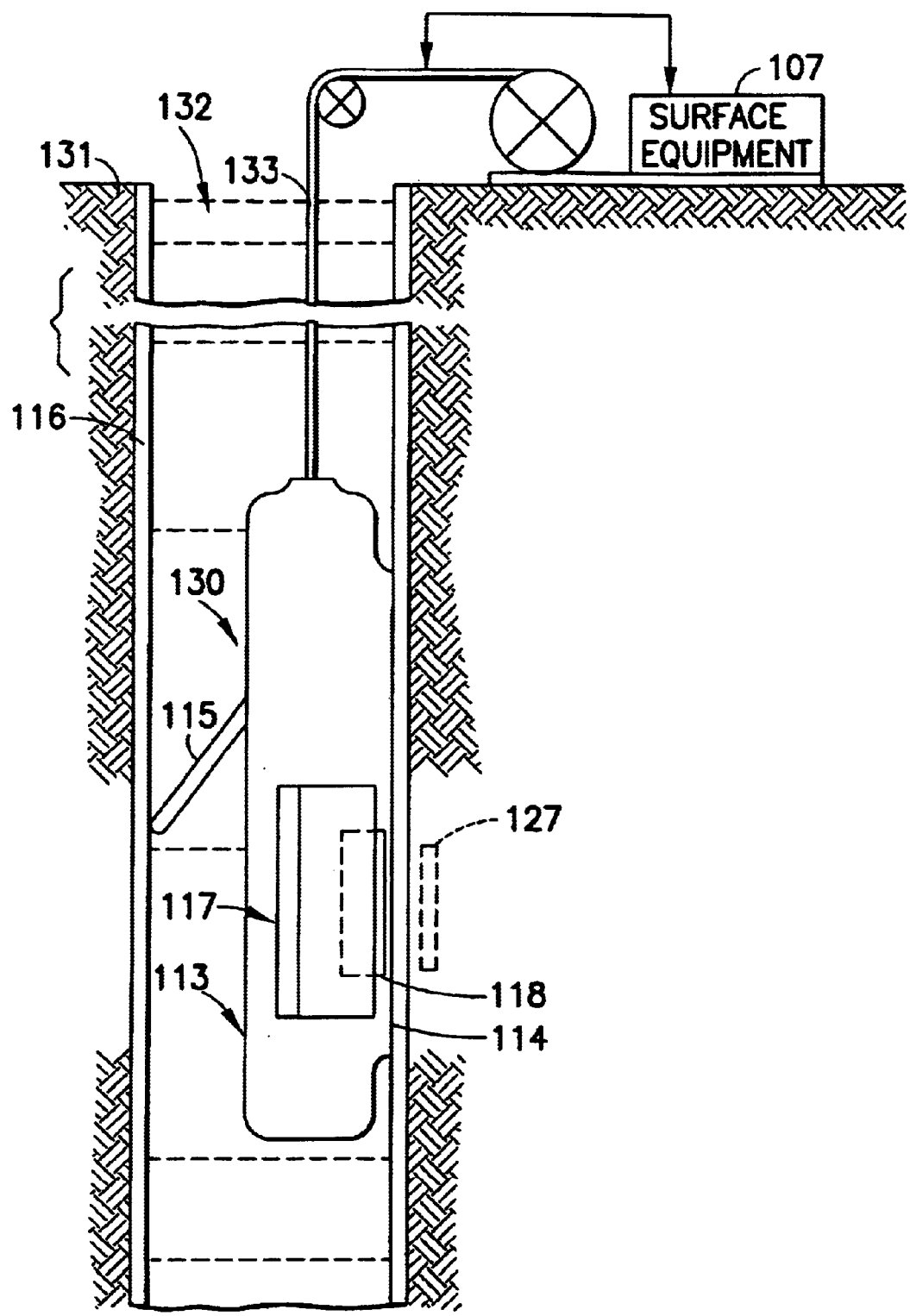
FIG. 12 is a schematic diagram, partially in block form, of one embodiment of a well logging apparatus that can be used in implementing methods according to the invention in a borehole environment.

The methods of the invention may be practiced in a laboratory setting or in a downhole environment, such as with a well logging device. FIG. 12 shows an apparatus that can be utilized for practicing embodiments of the invention to investigate subsurface formations 131 traversed by a borehole 132. A magnetic resonance investigating apparatus or logging device 130 is suspended in the borehole 132 on an armored cable 133, the length of which substantially determines the relative depth of the device 130. The length of cable 133 is controlled by suitable means at the surface such as a drum and winch mechanism. Surface equipment, represented at 107, can be of conventional type, and can include a processor subsystem that communicates with all the downhole equipment. It will be understood that some of the processing can be performed downhole and that, in some cases, some of the processing may be performed at a remote location. Also, while a wireline is illustrated, alternative forms of physical support and communicating link can be used, for example in a measurement-while-drilling or logging-while-drilling system, in practicing the methods of the invention.

As described, for example, in U.S. Pat. Nos. 5,055,787, 5,055,788, and 5,153,514, the magnetic resonance logging device 130 can have a face 114 to intimately contact the borehole wall. The borehole wall may have a mudcake 116 thereon. A retractable arm 115 is provided which can be activated to press the body of the tool 113 through the mudcake against the borehole wall during a logging run, with the face 114 pressed against the wall's surface. Although the tool 113 is shown as a single body, the tool may alternatively include separate components such as a cartridge, sonde or skid, and the tool may be combinable with other logging tools.

The logging device includes, for example, a permanent magnet or permanent magnet array 117, which may be made of a samarium-cobalt-magnetic material, and one or more RF antennas 118. The investigation region, or sensitivity zone, represented generally at 127, is a region in the formation in which the static magnetic field is generally uniform, although this is not necessarily required for operation in accordance with the invention. Some embodiments of the invention may take advantage of inherent non-uniformity in the static magnetic field to generate a static magnetic field gradient within the investigation region 127. In other embodiments, pulsed magnetic field gradients may be used to generate or enhance a magnetic field gradient within the investigation region 127. U.S. Pat. No. 5,796,252, for example, which is incorporated herein by reference, describes various embodiments of an antenna that can be incorporated into logging devices of the invention and used to produce pulse field gradients in the investigation region 127. It will be understood that other suitable tool configurations can be utilized for practicing the invention.

While the invention has been described herein with reference to certain examples and embodiments, it will be evident that various modifications and changes may be made to the embodiments described above without departing from the scope and spirit of the invention as set forth in the claims.

What is claimed is:

1. A method of extracting information about a porous media containing two or more fluids comprising:
    a) applying a magnetic field gradient to said two or more fluids;
    b) applying a first series of oscillating magnetic field pulses to said two or more fluids, said first series of pulses having an initial magnetic field pulse, a first portion followed by a second portion;
    c) detecting magnetic resonance signals generated in (b);
    d) after a wait time, applying a second series of oscillating magnetic field pulses to said two or more fluids, said second series of pulses having an initial magnetic field pulse, a third portion followed by said second portion;
    e) detecting magnetic resonance signals generated in (d); and
    f) analyzing said detected signals to determine the wettability of said porous media.

2. The method of claim 1, wherein said magnetic field gradient is a static field gradient.

3. The method of claim 1, wherein said magnetic field gradient is a pulsed field gradient.

4. The method of claim 1, wherein analyzing said detected signals includes separating diffusion and relaxation effects.

5. The method of claim 4, wherein analyzing the detected signals includes determining the diffusion coefficient of at least one of said two or more fluids.

6. The method of claim 1, wherein analyzing the detected signals includes distinguishing between different components of said two or more fluids.

7. The method of claim 1 further comprising:
    g) repeating (d) and (e) one or more times, wherein each additional series of pulses, comprises an initial magnetic field pulse, a modified third portion followed by said second portion.

8. The method of claim 7, wherein analyzing the detected signals includes developing a two-dimensional function describing the diffusion and relaxation of said two or more fluids.

9. The method of claim 8, further comprising:
    h) developing a calibration function describing the relationship between diffusion and relaxation representative of at least one of said two or more fluids; and
    i) correlating said calibration function to said two-dimensional function.

10. The method of claim 1 wherein said porous media is an earth formation.

11. A method of extracting information about an earth formation containing two or more fluids comprising:
    a) applying a magnetic field gradient to said two or more fluids;
    b) applying a first series of oscillating magnetic field pulses to said two or more fluids, said first series of pulses having an initial magnetic field pulse, a first portion followed by a second portion;
    c) detecting magnetic resonance signals generated in (b);
    d) after a wait time, applying a second series of oscillating magnetic field pulses to said two or more fluids, said second series of pulses having an initial magnetic field pulse, a third portion followed by said second portion;
    e) detecting magnetic resonance signals generated in (d); and
    f) analyzing said detected signals to determine the wettability of said earth formation.

12. The method of claim 11, wherein said magnetic field gradient is a static field gradient.

13. The method of claim 11, wherein said magnetic field gradient is a pulsed field gradient.

14. The method of claim 11, wherein analyzing said detected signals includes separating diffusion and relaxation effects.

15. The method of claim 14, wherein analyzing the detected signals includes determining the diffusion coefficient of said two or more fluids.

16. The method of claim 11, wherein analyzing the detected signals includes distinguishing between different components of said two or more fluids.

17. The method of claim 11 further comprising:
g) repeating (d) and (e) one or more times, wherein each additional series of pulses, comprises a modified third portion followed by said second portion.

18. The method of claim 17, wherein analyzing the detected signals includes developing a two-dimensional function describing the diffusion and relaxation of said two or more fluids.

19. The method of claim 18, further comprising:
h) developing a calibration function describing the relationship between diffusion and relaxation representative of at least one of said two or more fluids; and
i) correlating said calibration function with said two-dimensional function.

20. A logging apparatus comprising:
a logging tool that is moveable through a borehole; and
a processor that is coupled with the logging tool, the processor being programmed with instructions which, when executed by the processor:
cause the logging tool to:
i) generate a first series of oscillating magnetic field pulses to said region of earth formation, the first series having an initial magnetic field pulse, a first portion followed by a second portion;
ii) detect magnetic resonance signals produced from the region of earth formation;
iii) after a wait time, apply a second series of oscillating magnetic field pulses to said region of earth formation, said second series having an initial magnetic field pulse, a third portion followed by said second portion;
iv) detect magnetic resonance signals produced from the region of earth formation; and
cause the processor to:
v) analyze the detected magnetic resonance signals to determine the wettability of the region of investigation.

21. The apparatus of claim 20, wherein (v) includes separating diffusion and relaxation effects.

22. The apparatus of claim 20, wherein (v) includes determining the diffusion coefficient of said two or more fluids.

23. The apparatus of claim 20, wherein (v) includes distinguishing between different components of said two or more fluids.

24. The apparatus of claim 20, wherein the instructions further cause the logging tool to repeat (iii) and (iv) one or more times, wherein each additional series of pulses, comprises an initial magnetic field pulse, a modified third portion followed by said second portion.

25. The apparatus of claim 24, wherein the instructions further cause the processor to develop a two-dimensional function describing the diffusion and relaxation of said region of earth formation.

26. The apparatus of claim 25, wherein the processor is programmed with a calibration function describing the relationship between diffusion and relaxation representative of at least one of said two or more fluids and wherein the instructions further cause the processor to correlate said calibration function to said two-dimensional function.

* * * * *